United States Patent
Viswanathan et al.

(10) Patent No.: US 11,706,682 B2
(45) Date of Patent: Jul. 18, 2023

(54) SWITCHABLE COMMUNICATION TRANSPORT FOR COMMUNICATION BETWEEN PRIMARY DEVICES AND VEHICLE HEAD UNITS

(71) Applicant: Google LLC, Mountain View, CA (US)

(72) Inventors: Sriram Viswanathan, Bothell, WA (US); Carsten Isert, Munich (DE); Bernd Holzhey, Neubiberg (DE); Leslie Glenn Watkins, Davis, CA (US); Paul Dermot Crowley, Mountain View, CA (US); Marvin Wilhelm Max Paul, Castro Valley, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/130,734

(22) Filed: Dec. 22, 2020

(65) Prior Publication Data

US 2022/0201580 A1 Jun. 23, 2022

(51) Int. Cl.
*H04W 36/22* (2009.01)
*H04W 76/15* (2018.01)
(Continued)

(52) U.S. Cl.
CPC ............. *H04W 36/22* (2013.01); *H04L 12/40* (2013.01); *H04L 47/2408* (2013.01);
(Continued)

(58) Field of Classification Search
CPC ...... H04W 36/22; H04W 76/15; H04L 12/40; H04L 47/2408; H04L 67/12; H04L 2012/41025
See application file for complete search history.

(56) References Cited

U.S. PATENT DOCUMENTS 7,610,057 B2  10/2009  Bahl et al.
8,798,003 B2   8/2014  Arakawa
(Continued)

FOREIGN PATENT DOCUMENTS

DE  102018206785 A1  11/2019
JP   2002044005 A    2/2002
(Continued)

OTHER PUBLICATIONS

Extended Search Report from counterpart European Application No. 21197481.1 dated Mar. 18, 2022, 9 pp.
(Continued)

*Primary Examiner* — Eric Myers
(74) *Attorney, Agent, or Firm* — Shumaker & Sieffert, P.A.

(57) ABSTRACT

In general techniques are described by which to provide switchable communication transport for communication between primary devices and vehicle head units. A primary device comprising a memory and a processor may be configured to perform the techniques. The memory may store an operating system and an application. The processor may execute the operating system to present a single communication interface by which the application establishes a first transport between the primary device and a vehicle head unit that facilitates execution of a mode in which the application provides data for presentation by the vehicle head unit. The processor may also execute the application to transmit, during execution of the mode, the data via the first transport, where the operating system switches, during execution of the mode, from the first transport to a second transport. The application transmits, during execution of the mode, the data via the second transport.

18 Claims, 6 Drawing Sheets

(51) Int. Cl.
  *H04L 12/40* (2006.01)
  *H04L 47/2408* (2022.01)
  *H04L 67/12* (2022.01)
(52) U.S. Cl.
  CPC .............. *H04L 67/12* (2013.01); *H04W 76/15* (2018.02); *H04L 2012/40215* (2013.01)

(56) References Cited

U.S. PATENT DOCUMENTS

| | | |
|---|---|---|
| 8,831,585 B2 | 9/2014 | Nicholson et al. |
| 9,144,094 B2 | 9/2015 | Bhamidipati et al. |
| 9,534,909 B2 | 1/2017 | Rhee et al. |
| 9,571,284 B2 | 2/2017 | Leboeuf et al. |
| 9,584,601 B2 | 2/2017 | Asaduzzaman et al. |
| 9,925,936 B2 | 3/2018 | Rai |
| 2005/0049021 A1 | 3/2005 | Nedelcu et al. |
| 2005/0239497 A1 | 10/2005 | Bahl et al. |
| 2008/0080458 A1 | 4/2008 | Cole |
| 2011/0228749 A1* | 9/2011 | Taghavi Nasrabadi ............ H04L 12/5692 370/328 |
| 2013/0106750 A1 | 5/2013 | Kurosawa |
| 2014/0120829 A1 | 5/2014 | Bhamidipati et al. |
| 2015/0319001 A1 | 11/2015 | Kojima et al. |
| 2016/0234870 A1 | 8/2016 | Borges et al. |
| 2016/0270144 A1* | 9/2016 | Thanayankizil ..... H04B 1/3822 |
| 2017/0041304 A1 | 2/2017 | Tai et al. |
| 2017/0041381 A1 | 2/2017 | Tai et al. |
| 2017/0366596 A1 | 12/2017 | Han et al. |
| 2019/0068718 A1 | 2/2019 | Lee |
| 2019/0387382 A1 | 12/2019 | Wojcieszak et al. |
| 2020/0100091 A1 | 3/2020 | Lee et al. |
| 2020/0162205 A1 | 5/2020 | Han et al. |
| 2020/0164747 A1 | 5/2020 | Oh |
| 2021/0141073 A1 | 5/2021 | Okazaki |
| 2021/0243274 A1 | 8/2021 | Thomas |
| 2021/0306909 A1 | 9/2021 | Hosseini et al. |
| 2023/0007460 A1 | 1/2023 | Tsau et al. |

FOREIGN PATENT DOCUMENTS

| | | |
|---|---|---|
| JP | 2005328520 A | 11/2005 |
| JP | 2007521682 A | 8/2007 |
| JP | 2010505347 A | 2/2010 |
| JP | 2012503449 A | 2/2012 |
| JP | 2012120089 A | 6/2012 |
| JP | 2013511901 A | 4/2013 |
| JP | 2013236346 A | 11/2013 |
| JP | 2014103580 A | 6/2014 |
| JP | 2014532321 A | 12/2014 |
| JP | 2016012918 A | 1/2016 |
| JP | 2016503601 A | 2/2016 |
| KR | 20150079820 A | 7/2015 |
| KR | 20170105545 A | 9/2017 |
| KR | 20190021054 A | 3/2019 |
| WO | 2010033919 A2 | 3/2010 |
| WO | 2012081622 A | 6/2012 |
| WO | 2013039760 A1 | 3/2013 |
| WO | 2013039763 A1 | 3/2013 |
| WO | 2019211024 A1 | 11/2019 |

OTHER PUBLICATIONS

Notice of Allowance from U.S. Appl. No. 17/130,755, dated Jun. 23, 2022, 5 pp.
Office Action from U.S. Appl. No. 17/130,755, dated Mar. 30, 2022, 10 pp.
Response to Office Action dated Mar. 30, 2022, from U.S. Appl. No. 17/130,755, filed Jun. 13, 2022, 14 pp.
U.S. Appl. No. 17/130,755, filed Dec. 22, 2020, naming inventors Tsau et al.
First Examination Report from counterpart Indian Application No. 202144042493 dated Jul. 13, 2022, 6 pp.
Office Action from counterpart Korean Application No. 10-2021-0131733 dated Sep. 19, 2022, 11 pp.
Response to First Examination Report dated Jul. 13, 2022, from counterpart Indian Application No. 202144042493 filed Oct. 18, 2022, 18 pp.
Response to Office Action dated Sep. 19, 2022, from counterpart Korean Application No. 10-2021-0131733 filed Nov. 8, 2022, 18 pp.
Notice of Intent to Grant from counterpart Korean Application No. 10-2021-0131733 dated Dec. 29, 2022, 4 pp.
Response to Extended Search Report dated Mar. 18, 2022, from counterpart European Application No. 21197481.1 filed Nov. 30, 2022, 22 pp.
Office Action from counterpart Japanese Application No. 2021-160961 dated Feb. 21, 2023, 10 pp.

* cited by examiner

SWITCHABLE COMMUNICATION TRANSPORT FOR COMMUNICATION BETWEEN PRIMARY DEVICES AND VEHICLE HEAD UNITS

BACKGROUND

A vehicle may include a so-called "head unit" or other integrated head unit that presents an interface (e.g., a graphical user interface—GUI) by which to control the vehicle systems, such as a heating, ventilation, and air conditioning (HVAC) system, a lighting system (for controlling interior and/or exterior lights), an infotainment system, a seating system (for controlling a position of a driver and/or passenger seat), etc. The interface may be presented via a console (e.g., an in-vehicle display). A user of a vehicle, such as an automobile, motorcycle, a bus, a recreational vehicle (RV), a semi-trailer truck, a tractor or other type of farm equipment, a train, a plane, a drone, a helicopter, a personal transport link vehicle, or the like, may connect a primary device (e.g., mobile phone) to the vehicle's head unit to project (or, in other words, serve) a graphical user interface to the head unit. The head unit may then present the graphical user interface via a display coupled to the head unit.

To project the graphical user interface to the head unit, the primary device, such as a smartphone, may connect to the head unit via a wired transport or a wireless transport. Wired transports may include a universal serial bus (USB) transport in which the primary device is coupled to the head unit via a USB cable. Wireless transports may include a personal area network (PAN) transport, which may include low energy and high (or, in other words, normal) energy versions, an ultra-wideband (UWB) connection (which may represent another type of PAN transport), a wireless local area network (WLAN) connection, and the like. When communication between the head unit and the primary device degrades, become disrupted, or otherwise fails, the primary device may restart the transport to reestablish the transport with the vehicle head unit, where the restart of the transport may disrupt projection of the graphical user interface and potentially require the primary device to establish a different form of connection (e.g., switching from a wireless transport to a wired transport).

SUMMARY

In general, techniques are described by which a primary device may seamlessly switch between transports during projection of a graphical user interface to a head unit or support of a graphical user interface output by the head unit. That is, an operating system of the primary device may present a single communication interface by which to establish a transport over which the primary device may project or support a graphical user interface for display at the head unit. An application executed by the primary device may interface with this single communication interface to establish the transport, requesting via the single communication interface the transport by which to project or support the graphical user interface. The operating system of the primary device may, responsive to the request for the transport, select the transport from a number of different transports (including both wired and wireless transports). The operating system may, in this respect, offload transport selection from the application and remove any dependency on the application in establishing the appropriate transport.

When the operating system of the primary device selects a transport that does not accommodate the graphical user interface and one or more applications associated with the graphical user interface, the operating system of the primary device may select a different transport of the number of different transports that better accommodates the one or more applications associated with the graphical user interface. For example, a user of the primary device may initially initiate execution of a projection application that facilitates projection of a first graphical user interface associated with another application, e.g., a telephone application, that requires little transport bandwidth (compared to a graphical user interface associated with, as an example, a different application, such as a navigation application).

The operating system of the primary device may select a PAN transport as the initial transport for the first graphical user interface. The user may then interface with the first graphical user interface to initiate the navigation application that consumes more transport bandwidth. Rather than require the client to restart the projection of the first graphical user interface and select a different transport, the operating system of the primary device may seamlessly transition from the PAN transport to a more robust wireless transport (e.g., WLAN) and/or a wired transport such that the underlying application (i.e., the navigation application in this example) is unaware of the switch between transports.

In this respect, various aspects of the techniques may improve the user experience as the primary device may not quit projection (or support) when connections via a transport are interrupted (e.g., a wired connection becomes temporarily disconnected, and/or interference occurs in a wireless transport) or when the primary device requires different transport characteristics (e.g., different bandwidth, different latency, different reliability in terms of lost data, etc.). Such improvements in the user experience may be particularly beneficial in vehicle settings in which the user of the primary device is operating the vehicle as the improved user experience may reduce distractions to the user while operating the vehicle and thereby potentially promote safety. Moreover, by reducing restarts, various aspects of the techniques may enable the primary device and the head unit to operate more efficiently (e.g., in terms of processor cycles expended, memory consumed, memory bus bandwidth utilized, wireless bandwidth consumed, etc.) as each restart requires additional resources (e.g., processor cycles, memory space, memory bus bandwidth, wireless bandwidth, etc.) to renegotiate the transport by which the projection of the graphical user interface occurs between the primary device and the head unit.

In some examples, various aspects of the techniques are directed to a method comprising: presenting, by an operating system executed by a primary device, a single communication interface by which an application establishes a first transport between the primary device and a vehicle head unit that facilitates execution of a mode in which the application provides data for presentation by the vehicle head unit; transmitting, by the application and during execution of the mode, the data via the first transport; switching, by the operating system and during execution of the mode, from the first transport to a second transport; and transmitting, by the application and during execution of the mode, the data via the second transport.

In some examples, various aspects of the techniques are directed to a primary device comprising: a memory configured to store an operating system and an application; and one or more processors configured to: execute the operating system to present a single communication interface by which the application establishes a first transport between the primary device and a vehicle head unit that facilitates execution of a mode in which the application provides data for presentation by the vehicle head unit; and execute the application to transmit, during execution of the mode, the data via the first transport; wherein the operating system switches, during execution of the mode, from the first transport to a second transport, and wherein the application transmits, during execution of the mode, the data via the second transport.

In some examples, various aspects of the techniques are directed to a non-transitory computer-readable storage medium having instructions stored thereon that, when executed, cause one or more processors of a primary device to: execute an operating system to present a single communication interface by which a application establishes a first transport between the primary device and a vehicle head unit that facilitates execution of a mode in which the application provides data for presentation by the vehicle head unit; and execute the application to transmit, during execution of the mode, the data via the first transport; wherein the operating system switches, during execution of the mode, from the first transport to a second transport, and wherein the application transmits, during execution of the mode, the data via the second transport.

The details of one or more examples are set forth in the accompanying drawings and the description below. Other features, objects, and advantages of the disclosure will be apparent from the description and drawings, and from the claims.

DETAILED DESCRIPTION

Figure 1:
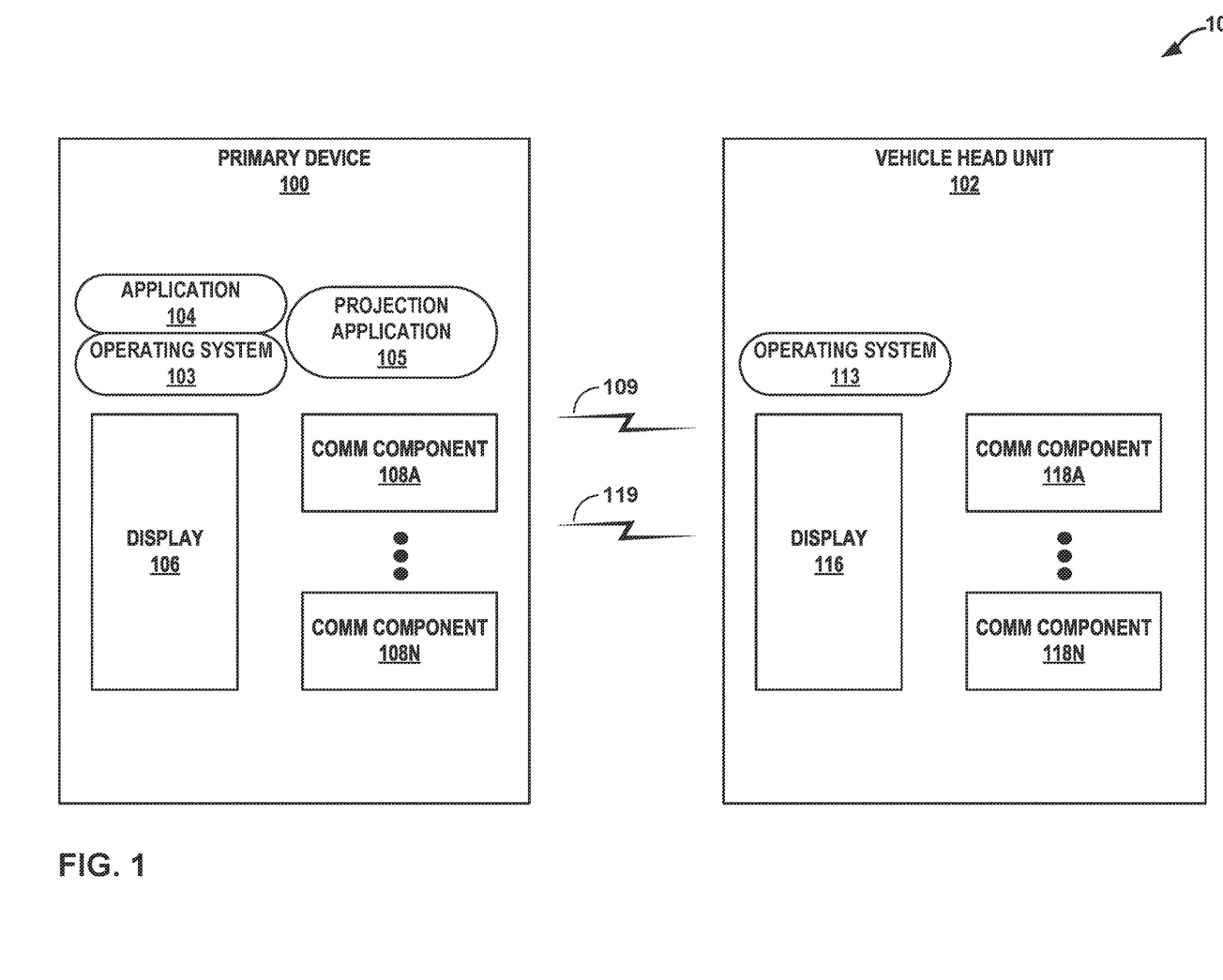
FIG. 1 is a conceptual diagram illustrating an example system that is configured to perform various aspects of the switchable communication transport techniques described in this disclosure.

FIG. 1 is a conceptual diagram illustrating an example system that is configured to perform various aspects of the switchable communication transport techniques described in this disclosure. As shown in the example of FIG. 1, a system 10 may manage a plurality of transports to facilitate execution of a projection mode (or other modes, such as a supporting mode) in accordance with one or more techniques of this disclosure. System 10 may include a primary device 100 and a vehicle head unit 102.

In the example of FIG. 1, primary device 100 is a smartphone. However, other examples of primary device 100 may be a cellular phone, a smartphone, a head unit expansion or upgrade cartridge module, a personal digital assistant (PDA), a laptop computer, a tablet computer, a portable gaming device, a portable media player, an e-book reader, a watch (including a so-called smartwatch), an add-on device (such as a casting device), smart glasses, a gaming controller, or another type of portable or mobile device.

Vehicle head unit 102 may represent an integrated head unit that presents an interface (e.g., a graphical user interface—GUI) by which to control the vehicle systems, such as a heating, ventilation, and air conditioning (HVAC) system, a lighting system (for controlling interior and/or exterior lights), an infotainment system, a seating system (for controlling a position of a driver and/or passenger seat), etc. The interface may be presented via a console (e.g., an in-vehicle display, which is shown as display 116 in the example of FIG. 1). Vehicle head unit 102 may be included in a motorcycle, a bus, a recreational vehicle (RV), a semi-trailer truck, a tractor or other type of farm equipment, a train, a plane, a drone, a helicopter, a personal transport vehicle, or any other type of vehicle capable of managing transports in accordance with one or more of the techniques described herein.

Primary device 100 may, as shown in the example of FIG. 1, include operating system 103 that provides an execution environment for one or more applications, such as application 104. Operating system 103 may represent a multi-threaded operating system or a single-threaded operating system with which application 104 may interface to access hardware of primary device 100. Operating system 103 may include a kernel that facilitates access to the underlying hardware of primary device 100, where kernel may present a number of different interfaces (e.g., application programmer interfaces—APIs) that application 104 may invoke to access the underlying hardware of primary device 100.

Examples of the underlying hardware of primary device 100 includes one or more processors (which are not shown for ease of illustration) that support execution of operating system ("OS") 103 and application 104, display 106, and communication ("COMM") components 108A-108N ("comm components 108," which may also be referred to as "communication components 108"). Display 106 of primary device 100 may represent a presence-sensitive display that functions as an input device and as an output device. Presence-sensitive display 106 may be implemented using various display hardware.

For instance, presence-sensitive display 106 may function as an input device using a presence-sensitive input component, such as a resistive touchscreen, a surface acoustic wave touchscreen, a capacitive touchscreen, a projective capacitance touchscreen, a pressure sensitive screen, an acoustic pulse recognition touchscreen, or another presence-sensitive display technology. Presence-sensitive display 106 may function as an output (e.g., display) device using any one or more display components, such as a liquid crystal display (LCD), dot matrix display, light emitting diode (LED) display, organic light-emitting diode (OLED) display, e-ink, or similar monochrome or color display capable of outputting visible information to a user of primary device 100.

Communication components 108 may include wireless communication devices capable of transmitting and/or receiving communication signals such as a cellular radio, a 3G radio, a 4G radio, a 5G radio, a ultra-wide bandwidth (UWB) radio, a Bluetooth® radio (or any other PAN radio), an NFC radio, or a Wi-Fi™ radio (or any other WLAN radio). Additionally or alternatively, communication components 108 may include wired communication devices capable of transmitting and/or receiving communication signals via a direct link over a wired communication medium (e.g., a universal serial bus—USB—cable).

Operating system 103 and/or application 104 may present a graphical user interface (GUI) with which a user of primary device 100 may interface to interact with primary device 100. Operating system 103 may present, via display 106, a GUI that includes one or more icons or other visual representations of application 104, where the user of primary device 100 may select one or more of the icons or other visual representations to access various services provided by primary device 100 either by way of operating system 103 or by way of application 104.

For example, operating system 103 may include various integrated applications (where application 104 may represent one or more of these integrated applications) that allow for telephone services (e.g., cellular telephony services, Voice over Internet Protocol—VoIP—services, etc.), web conferencing services, video conferencing services, texting services, email services, web browsing services (e.g., via an integrated web browser), navigation services, assistant services, application store services (by which to obtain third party applications, where application 104 may represent either or both of integrated first party applications and/or third party applications obtained via the application store services), and/or any other service provided by way of integrated first party applications.

Application 104 may represent, as noted above, a first party application developed and provides as an application integrated into operating system 103 or a third-party application that the user of primary device 100 obtains via application store services provided by way of operating system 103. Application 104 may extend software functionality of primary device 100, where application 104 may execute within an execution environment presented by operating system 103. Application 104 may, as a few examples, provide gaming services (e.g., video games), email services, web browsing services, texting and/or chat services, web conferencing services, video conferencing services, music services (including streaming music services), video services (including video streaming services), navigation services, word processing services, spreadsheet services, slide and/or presentation services, assistant services, text entry services, or any other service commonly provided by applications.

As also shown in the example of FIG. 1, vehicle head unit 102 may include operating system 113, which may be similar or substantially similar to operating system 103 in that operating system 113 may present an execution environment in which one or more applications (which are not shown in the example of FIG. 1 for ease of illustration purposes) may execute to extend functionality of (or, in other words, services provided by) vehicle head unit 102. Operating system 113 may include integrated first party applications that provide services similar to those discussed above with respect to the integrated applications of operating system 103. Moreover, the one or more third party applications executing in the execution environment provided by operating system 113 may provide services similar to those discussed above with respect to application 104.

In any event, operating system 113 may present interfaces by which the applications may interface with underlying hardware of vehicle head unit 102. The underlying hardware of vehicle head unit 102 may include one or more processors (which again are not shown in the example of FIG. 1 for ease of illustration purposes) that are configured to execute operating system 113 and the one or more applications, display 116 and communication ("COMM") components 118A-118N ("comm components 118," which may also be referred to as "communication components 118").

Display 116 may be similar to display 106, where display 116 may, similar to display 106, represent a presence-sensitive display (and as such may be referred to as "presence-sensitive display 116"). That is, similar to presence-sensitive display 106 of primary device 100, presence-sensitive display 116 may function as an input device (e.g., by using a presence-sensitive input component, such as a resistive touchscreen, a surface acoustic wave touchscreen, a capacitive touchscreen, a projective capacitance touchscreen, a pressure sensitive screen, an acoustic pulse recognition touchscreen, etc.) and as an output device (e.g., by using any one or more display components, such as a liquid crystal display (LCD), dot matrix display, light emitting diode (LED) display, organic light-emitting diode (OLED) display, e-ink, etc.). Moreover, similar to communication components 108 of primary device 100, communication components 118 may include wireless and wired communication interfaces capable of transmitting and/or receiving communication signals such as a cellular radio, a 3G radio, a 4G radio, a 5G radio, a Bluetooth® radio (or any other type of PAN radio), a Wi-Fi™ radio (or any other type of WLAN radio), ethernet, USB, etc.

An occupant of the vehicle in which vehicle head unit 102 is located may connect primary device 100 (e.g., a smartphone) to vehicle head unit 102 to project a graphical user interface (sourced by operating system 103 and/or application 104) to vehicle head unit 102. Vehicle head unit 102 may then present the graphical user interface via display 116.

To project the graphical user interface to vehicle head unit 102, primary device 100 may connect to vehicle head unit 102 via a wired transport or a wireless transport provided via a communication session between communication components 108 and corresponding communication components 118. Wired transports may include a universal serial bus (USB) transport in which primary device 100 is coupled to vehicle head unit 102 via a USB cable. Wireless transports may include a personal area network (PAN) transport, which may include low energy and high (or, in other words, normal) energy versions, a wireless local area network (WLAN) connection, and the like.

Initially, the occupant may couple or, in other words, pair primary device 100 to vehicle head unit 102 via one of comm components 108 that support a PAN wireless transport, where this coupling may be referred to as pairing. Once paired, primary device 100 may, so long as the one of comm components 108 is enabled, automatically pair with vehicle head unit 102. Once paired, operating system 113 of vehicle head unit 102 may present notifications via display 116 indicating that other forms of transports (e.g., a WLAN transport or wired transport) are required to establish projection of the GUI from primary device 100 (where projection has not yet begun in this instance).

In this respect, operating system 113 may represent a thin client that operates to receive the GUI projected by operating system 103 and/or application 104 of primary device 100. In other words, operating system 113 may include a hardware abstraction layer (HAL) and a thin kernel (that acts as the client) by which to support projection of the GUI provided by primary device 100. The HAL may allow primary device 100 to provide commands by which to interface with various aspects (e.g., heating, ventilation, and air conditioning systems—HVAC systems, seat control systems, lighting systems, navigation hardware—such as global positioning systems, or any other aspects noted above with respect to the vehicle) of the vehicle in which vehicle head unit 102 is integrated.

A "thin" client or a "thin" kernel refer to a client or kernel that provides sufficient functionality to support projection but does not provide a full-featured operating system experience. Such thin client or kernel may, in other words, not support native execution of applications by operating system 113, but rather provide an operating environment over which to interface with primary device 100 to obtain the GUI projected by primary device 100. The thin client or kernel may also provide, to primary device 100, data regarding occupant interaction with vehicle head unit 102 (e.g., selection of a location on display 116) and/or changing control states of the various aspects of the vehicle in which vehicle head unit 102 is integrated, such as the states of various physical controls in the vehicle, including buttons or other controls associated with vehicle head unit 102, controls integrated into the steering wheel or other control interface, etc. The thin client or kernel may enable more efficient execution of operating system 113 across a wider variety of vehicle head units that may have large differences in terms of hardware.

In any event, operating system 103 may interface with one or more of communication components 108 to establish a transport (which is shown as transport 109) between primary device 100 and vehicle head unit 102. In some instances, primary device 100 may include projection application 105 that indicates a particular transport of the number of different transports by which data from projection application 105 is to be communicated to vehicle head unit 102. In these instances, operating system 103 may present an interface (e.g., an application programming interface) by which projection application 105 may request operating system 103 to establish the particular transport. Projection application 105 may, in this instance, represent an application that facilitates projection of the GUI to vehicle head unit 102 (and providing a bridge between approved additional applications 104—e.g., for music streaming, navigation, telephone, notifications, etc.—and projection of GUIs for these applications 104).

Projection application 105 may then project the GUI for projection application 105 via requested transport 109 by which the occupant may select one or more additional applications 104 (e.g., by selecting icons or other visual representations) via display 116 of vehicle head unit 102. When discussing projection of the GUI, it should be understood that projection application 105 passes the data to be projected (e.g., representative of the GUI) to operating system 103, which interfaces with one or more of communication components 108 to output the data to be projected via transport 109 to vehicle head unit 102. Vehicle head unit 102 receives the data to be projected via transport 109 and a corresponding one of communication components 118 and interfaces with display 116 to present the GUI represented by the data received via transport 109.

In this configuration in which projection application 105 explicitly requests transport 109 via an interface presented by operating system 103, projection application 105 may only work via the requested transport (and possibly a different transport) and operating system 103 may not provide any way by which to switch between multiple transports. Moreover, operating system 103 may not allow multiple applications to concurrently project via the established transport as operating system 103 does not have a way to mitigate conflicts in projection between multiple applications (and the projecting applications are unaware of the competing projecting application).

As such, when transport 109 between vehicle head unit 102 and primary device 100 degrades, become disrupted, or otherwise fails, projection application 105 may restart transport 109 to reestablish transport 109 with vehicle head unit 102. The restart of the transport may disrupt projection of the graphical user interface and potentially require primary device 100 to establish a different form of transport (e.g., switching from a wireless transport to a wired transport).

Re-establishing transport 109 or establishing different forms of transport may result in operator or other occupant distraction that may present safety concerns as the operator or other occupant may need to interact with primary device 100. Moreover, repeatedly re-establishing transport 109 or establishing a different form of transport may result in inefficiencies (e.g., in terms of processor cycles, power, memory bandwidth, memory storage space, transport bandwidth, etc.) that degrade operation of primary device 100 and vehicle head unit 102.

In accordance with techniques of the disclosure, operating system 103 of primary device 100 may present a single communication interface by which to establish a transport 109 over which projection application 105 may project a graphical user interface for display at vehicle head unit 102. Projection application 105 executed by primary device 100 may interface with this single communication interface to establish transport 109, requesting via the single communication interface transport 109 by which to project the graphical user interface. Operating system 103 of primary device 100 may, responsive to the request for transport 109, select transport 109 from a number of different transports (including both wired and wireless transports). Operating system 103 may, in this respect, offload transport selection from projection application 105 and remove any dependency on projection application 105 in establishing the appropriate transport.

When operating system 103 of primary device 100 selects transport 109 that does not accommodate the graphical user interface and one or more applications 104 associated with the graphical user interface, operating system 103 of primary device 100 may select a different transport 119 of the number of different transports that better accommodates one or more of applications 104 associated with the graphical user interface. For example, a user of primary device 100 may initially initiate execution of projection application 105 that facilitates projection of a first graphical user interface associated with another application 104, e.g., a telephone application, that requires little transport bandwidth (compared to a graphical user interface associated with, as an example, a different application 104, such as a navigation application).

Operating system 103 of primary device 100 may select a PAN transport as the initial transport for the first graphical user interface. The user may then interface with the first graphical user interface via display 116 to initiate navigation application 104 that consumes more transport bandwidth. Rather than require the client to restart the projection of the first graphical user interface and select a different transport, operating system 103 of primary device 100 may seamlessly transition from the PAN transport to a more robust wireless transport (e.g., WLAN) and/or a wired transport such that the underlying application (i.e., navigation application 104 in this example) is unaware of the switch between transports 109/119.

In operation, operating system 103 may present a single communication interface by which projection application 105 establishes a first transport 109 between primary device 100 and vehicle head unit 102 that facilitates execution of a projection mode in which projection application 105 projects a graphical user interface to vehicle head unit 102. The single communication interface may represent a transport application programming interface (API) that exposes one or more function calls by which to request a transport (e.g., transport 109).

However, rather than dictate via the function calls the type of transport (e.g., wired or wireless, PAN or WLAN, etc.), the function calls generally abstract the transport from projection application 105. That is, projection application 105 is not informed by operating system 103 of the type of transport or various characteristics of the transport (e.g., in terms of latency, bandwidth, data loss, etc.) and instead requests the transport and then provides data representative of the GUI projected to vehicle head unit 102 to operating system 103 via the transport API. In this respect, operating system 103 offloads transport management from projection application 105 (and/or other applications such as applications 104).

Offloading transport management from projection application 105 may enable operating system 103 to better handle issues that may arise during projection. Moreover, operating system 103 may dynamically switch, during execution of the projection mode, between transport 109 and 119 without requiring projection application 105 to restart execution of the projection mode.

As such, projection application 105 may provide data indicative of the GUI to operating system 103 via the transport API and thereby project the GUI via first transport 109 during execution of the projection mode. Operating system 103 may, during execution of the projection mode, switch from first transport 109 to second transport 119. That is, projection application 105 may continue to provide data representative of the GUI to operating system 103 via the transport API, and operating system 103 may dynamically, without informing projection application 105, switch from transport 109 to transport 119.

Operating system 103 may switch from transport 109 to transport 119 in order to better accommodate different situations without interrupting execution of the projection mode by projection application 105. For example, assuming transport 109 is a wired transport and the wired transport is interrupted (e.g., because the USB cable becomes partially or fully disconnected), operating system 103 may dynamically switch from transport 109 to transport 119 that, in this example, likely represents a WLAN transport (as the WLAN transport offers similar bandwidth to the USB wired transport). Projection application 105 may then project the graphical user interface via transport 119 during execution of the projection mode.

In this respect, various aspects of the techniques may improve the user experience as primary device 100 may not quit projection when connections via transport 109 are interrupted (e.g., a wired connection becomes temporarily disconnected, and/or interference occurs in a wireless transport) or when primary device 100 requires different transport characteristics (e.g., different bandwidth, different latency, different reliability in terms of lost data, etc.). Such improvements in the user experience may be particularly beneficial in vehicle settings in which the user of the primary device is operating the vehicle as the improved user experience may reduce distractions to the user while operating the vehicle and thereby potentially promote safety.

Moreover, by reducing restarts, various aspects of the techniques may enable primary device 100 and vehicle head unit 102 to operate more efficiently (e.g., in terms of processor cycles expended, memory consumed, memory bus bandwidth utilized, wireless bandwidth consumed, etc.) as each restart requires additional resources (e.g., processor cycles, memory space, memory bus bandwidth, wireless bandwidth, etc.) to renegotiate transport 109 by which the projection of the graphical user interface occurs between primary device 100 and vehicle head unit 102.

While described with respect to the GUI, various aspects of the techniques may facilitate projection of data in general, where such data may include data representative of voice communications (such as for a telephone application), data representative of video communications (such as for a videoconferencing application), data representative of music (such as a music streaming or playback application), data representative of navigation playback that may include one or more of voice notifications, GUI notifications, and a GUI, or various combinations thereof. In this way, various aspects of the techniques may enable general data projection by projection application 105 and applications 104 working in conjunction with projection application 105 to project data via one or more transports to vehicle head unit 102.

Figure 2:
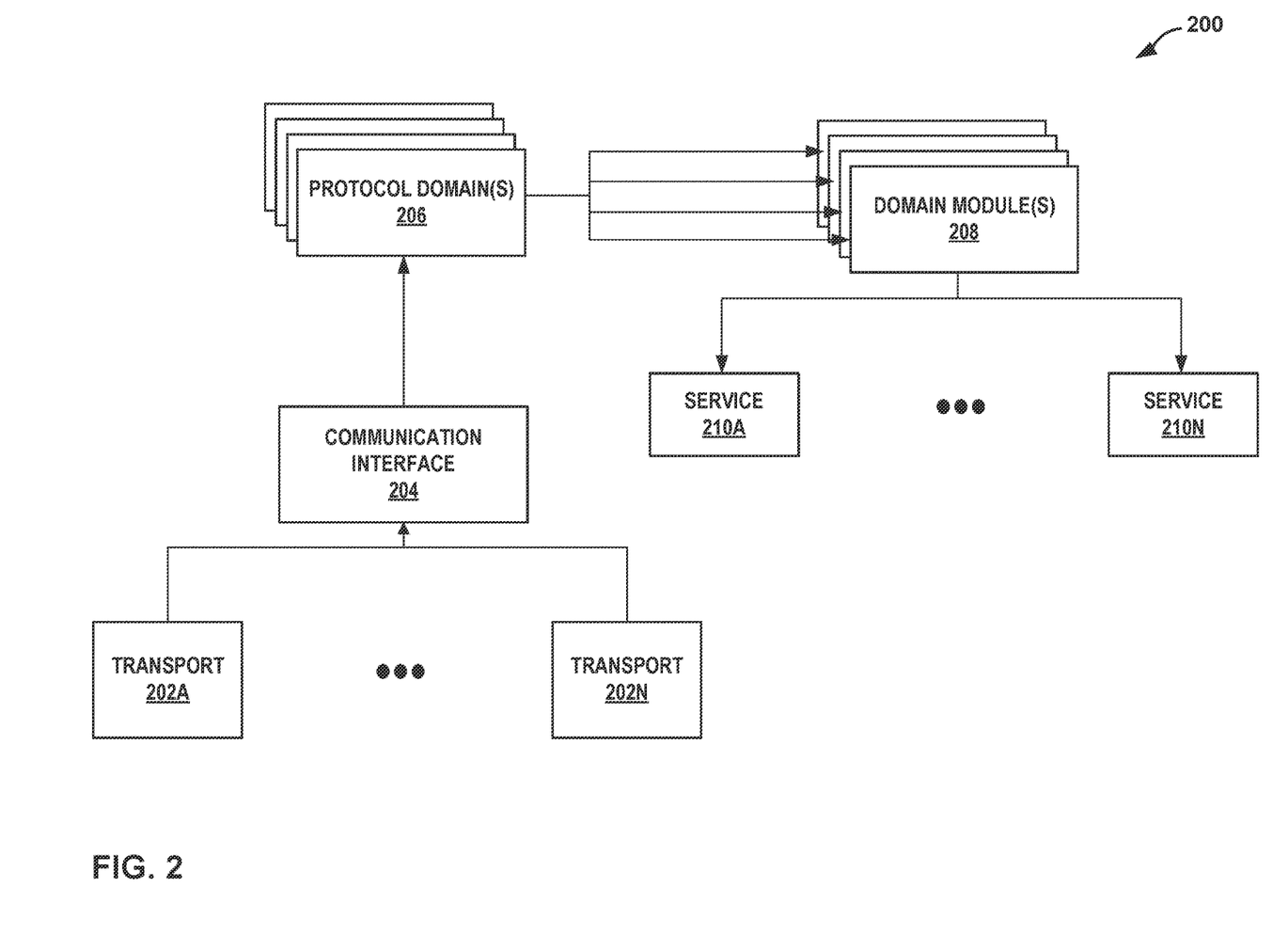
FIG. 2 is a block diagram illustrating an example projection architecture configured to perform various aspects of the transport management techniques described in this disclosure.

FIG. 2 is a block diagram illustrating an example projection architecture configured to perform various aspects of the transport management techniques described in this disclosure. Projection architecture 200 may represent a portion of a kernel for operating system 103 of primary device 100 and/or operating system 113 of vehicle head unit 102 shown in the example of FIG. 1. That is, projection architecture 200 may represent a communication architecture that enables backward compatibility for legacy projection applications 105 that implement function calls for establishing and managing a dedicated, projection application selected transport as well as forward-looking projection applications 105 that implement native function calls of the single communication interface.

As shown in the example of FIG. 2, projection architecture 200 includes transports 202A-202N ("transports 202"), single communication interface 204 (which may be referred to as a universal automotive link—UAL—transport 204), one or more protocol domains 206, one or more domain modules 208, and services 210A-210N ("services 210"). Transports 202 may represent transports 109 and 119 as well as the other transports noted above with respect to the example of FIG. 1. UAL transport 204 may represent the above noted single communication interface with which projection application 105 may interface to establish one or more of transports 202.

UAL transport 204 may, in other words, drive platform requirements for both primary device 100 and vehicle head unit 102 to create reliable socket streams over which projection of data may occur. That is, UAL transport 204 may negotiate platform requirements with respect to vehicle head unit 102 and primary device 100 to facilitate establishing a socket stream to be used by one or more of transports 202 during execution of the projection mode. UAL transport 204 may negotiate such requirement with vehicle head unit 102 in such a manner as to support a connected vehicle profile. In any event, with the socket stream established over PAN transports, WLAN transports, and/or USB transports, UAL transport 204 allows multiple protocol domains 206 to share the same transport.

Protocol domains 206 may each represent a controlled certification domain, meaning as an example that each protocol domain 206 may be terminated by a known verification mechanism to ascertain that the peer protocol domain (e.g., supported by operating system 113 of vehicle head unit 102) adheres to the protocol version specification. As such, protocol domains 206 may each represent, in some examples, a container that acts as a shim (e.g., for legacy projection applications) to translate legacy function calls into functions calls supported by UAL transport 204. Legacy projection applications may invoke legacy function calls for a legacy automotive link (LAL) transport. Protocol domains 206 may wrap the LAL transport in the shim container such that, when legacy function calls are invoked by the legacy projection application, protocol domains 206 may translate the legacy function calls into calls supported by UAL transport 204.

Each of protocol domains 206 may also provide a number of different functions, such as security mechanisms, while also allowing multiple protocol domains 206 to coexist and share the same underlying one of transports 202. Protocol domains 206 may, for example, support secure socket layer (SSL) mutual authentication, a secure-real-time transport protocol (SRTP), datagram transport layer security (DTLS), transport layer security (TLS), open security (no security), etc. The kernel of operating systems 103 and/or 113 may also dynamically add, remove, and update protocol domains 206 to facilitate seamless transfer between transports 202 while also promoting increased functionality for projecting data from primary device 100 to vehicle head unit 102.

To illustrate, consider that protocol domains 206 may facilitate an initial PAN connection via a PAN protocol, e.g., Bluetooth®, in which primary device 100 may pair (or, in other words, form an association with) vehicle head unit 102. After successfully pairing with primary device 100, vehicle head unit 102 may generate a key (e.g., a 32-byte key) that vehicle head unit 102 sends over the PAN connection to primary device 100. Primary device 100 may then initiate a Ukey2 connection in order to establish a secure session between primary device 100 and vehicle head unit 102. More information regarding Ukey2 can be found at GitHub project, entitled "Ukey2," last updated September 2016, and available at: github.com/google/ukey2.

Briefly, Ukey2 is a Diffie-Hellman based authenticated key exchange protocol, in which a client and server have a shared master secret that can be used to derive keys which can be used in a subsequent protocol. Ukey2 may allow server and clients to establish a secure channel in which to transmit passwords or other credentials for transitioning between transports (e.g., a new device wants to connect to a password-protected WLAN). As such, Ukey 2 enables primary device 100 to transition from a first secure transport to a second secure transport without having to perform reauthentication for the second transport and thereby disrupt operation of primary device 100 (or the connection between primary device 100 and vehicle head unit 102).

In any event, primary device 100 may perform the Ukey2 handshake in which primary device 100 sends an Advanced Encryption Standard-Galois Counter Mode (AES-GCM) encrypted message with Ukey verification token and a nonce. Vehicle head unit 102 may next decrypt the message and verify that the primary device token macthes a local token stored by vehicle head unit 102. Vehicle head unit 102 responds with an AES-GCP encrypted message with Ukey verification token and a nonce. Primary device 100 decrypts the message and verifies that the vehicle head unit token matches a local token stored by primary device 100. In this way, each of protocol domains 206 may also provide a number of different functions, such as security mechanisms, while also allowing multiple protocol domains 206 to coexist and share the same underlying one of transports 202.

Each of protocol domains 206 may register with UAL transport 204, whereupon each of protocol domains 206 may receive a unique identifier (ID) by which to uniquely reference each of protocol domains 206. Each of protocol domains 206 may, upon registration, also receive a unique integer ID in primary device 100 that is used as an identifier for packets destined to each one registered protocol domains 206. As noted above, each of protocol domains 206 may be added, removed, and updated without terminating the underlying one of transports 202. Each of protocol domains 206 may also be resumed from brief interruptions of transports 202, provided, in some instances, that the cache cookie is valid and ahs enough information and/or data to recover from the brief interruption.

Each of protocol domains 206 may reference one or more domain modules 208. Each of domain modules 208 represent a separately certifiable module that can be independently certified. Certification may refer to a process whereby functionality provided by domain modules 208 can be verified for safety, integrity (has not been compromised via malicious or other activity), or other verification and/or certification process. While projection architecture 200 includes domain modules 208, projection architecture 200 may not include domain modules 208 in some instances, as certification may not be necessary in all situations (e.g., for certain vehicles, such as slow moving farm equipment and/or older vehicles, certification may not be required).

To illustrate, consider the following example of a projection domain module (e.g., one of domain modules 208), which would function as a cluster that can be instantiated as a secondary activity projection as well. The same projection module may be used for native activity projection for cartridges, which is discussed in more detail below. Another example is a radio module or a vehicle action module, while the same module can also be used in the LAL transport, as well as for the cartridge.

Each of domain modules 208 may further reference one or more of services 210. Each of services 210 may represent a suite of services that are related, e.g., a display source service and an input source service may be encapsulated as a suite of services that performs a projection mode (as these services are concerned with a window and an input source for the window). In this respect, services 210 may each represent a mode (e.g., the projection mode) or other suite of services for performing dedicated services for hosting services to be provided to vehicle head unit 102.

Figure 3:
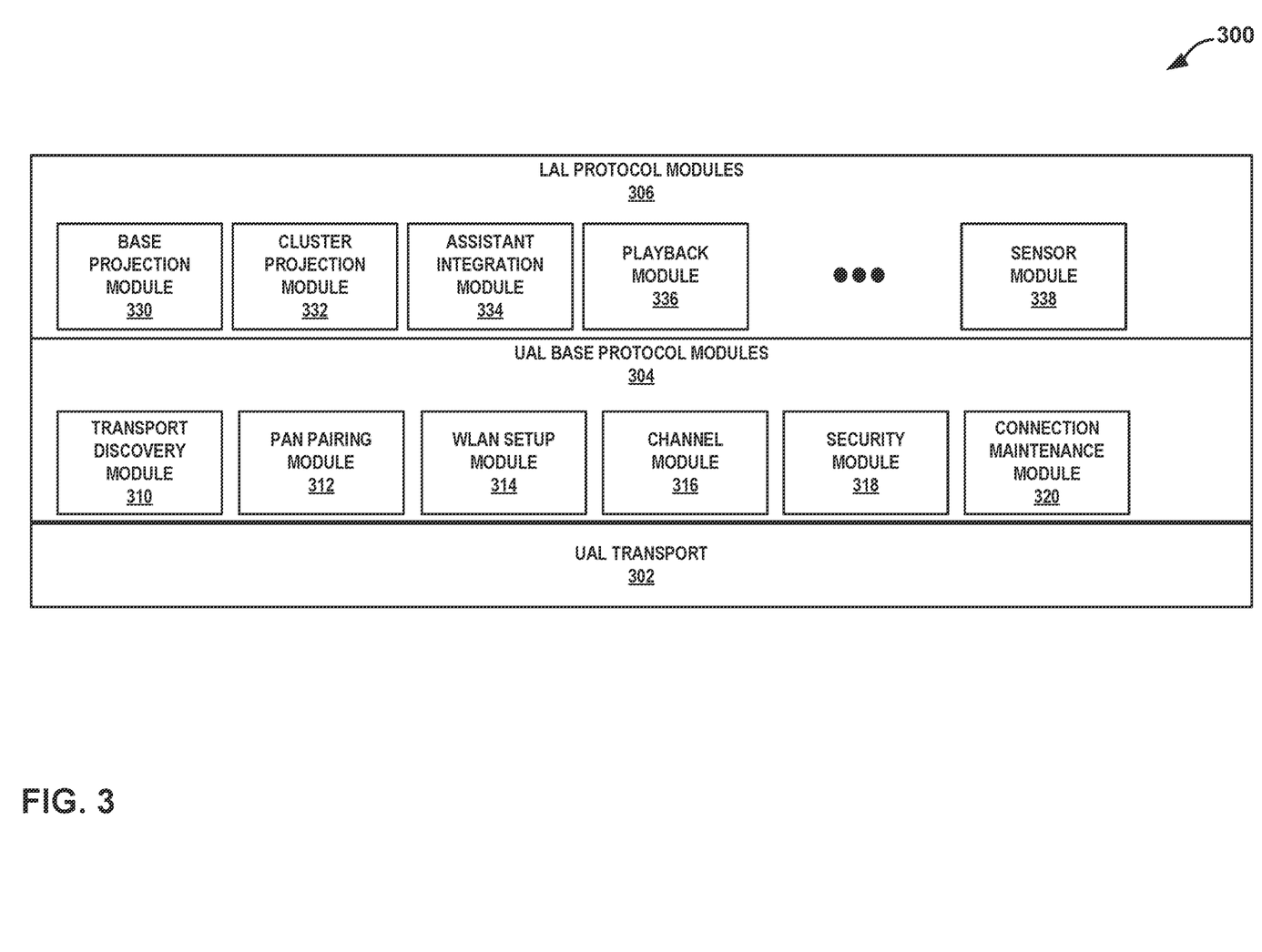
FIG. 3 is a block diagram illustrating a conceptual diagram of a hierarchical architecture of an operating system by which seamless switchable transport management may occur in accordance with various aspects of the techniques described in this disclosure.

FIG. 3 is a block diagram illustrating a conceptual diagram of a hierarchical architecture of an operating system by which seamless switchable transport management may occur in accordance with various aspects of the techniques described in this disclosure. Operating system 300 may represent an example of operating system 103 and/or operating system 113 that may configure one or more processors to, when executed, perform various aspects of the seamless transport management techniques described in this disclosure.

In the example of FIG. 3, operating system 300 may include a UAL transport 302, UAL base protocol modules 304, and LAL protocol modules 306. UAL transport 302 may represent the underlying transport (e.g., one or more of a PAN transport, a WLAN transport, a wired transport, such as a USB transport, etc.) selected by operating system 300 in the manner described above.

Operating system 300 may select UAL transport 302 based on one or more characteristics of the data projected by projection application, such as projection application 105 shown in the example of FIG. 1. The data to be projected may be sourced by projection application 105 or by application 104, where application 104 provides the data to projection application 105 for projection to vehicle head unit 102. Such characteristics may include a type of application sourcing the data (e.g., a navigation application may result in operating system 300 selecting a WLAN transport or a wired transport due to increased bandwidth requirements), an amount of bandwidth requested by the application sourcing the data (e.g., the navigation application may request a transport with larger bandwidth), and a capability of the application sourcing the data to provide a service.

Operating system 300 may, as an alternative or in conjunction with the above selection based on one or more characteristics, select UAL transport 302 based on a type of data to be communicated via UAL transport 302, an amount of data to be communicated via UAL transport 302 (e.g., as identified over time or via the initial request for UAL transport 302), or a packet of data to be communicated via UAL transport 302 (e.g., a VoIP packet may be distinct from an ordinary IP packet in that the VoIP packet may identify a VoIP port). Operating system 300 may, also as an alternative or in conjunction with any of the above selection criteria, select UAL transport 302 based on at least one of a latency threshold or a burstiness tolerance of the application sourcing the data. Operating system 300 may perform this selection based on any of the foregoing selection criteria for the first transport, such as transport 109, and/or when switching between transports, e.g., for transport 119.

UAL base protocol modules 304 may represent services provided by operating system 300 in support of establishing and managing UAL transport 302. As shown in the example of FIG. 3, UAL base protocol modules 304 may include a transport discovery module 310, a PAN pairing module 312, a WLAN setup module 314, a channel module 316, a security module 318, and a connection maintenance module 320.

Transport discovery module 310 may represent a module configured to discover various transports available for connecting primary device 100 to vehicle head unit 102. Transport discovery module 310 may offload transport discovery from the application sourcing the data for projection (which is assumed to be application 104 in this example).

PAN pairing module 312 may represent a module configured to perform various operations for establishing a PAN transport, including the initial pairing of primary device 100 to vehicle head unit 102 to facilitate reconnections when in proximity to one another without requiring the pairing process. WLAN setup module 314 may represent a module configured to establish a WLAN transport between primary device 100 and vehicle head unit 102.

Channel module 316 may represent a module configured to establish a channel over the transport by which the data to be projected is provided. Security module 318 may represent a module configured to secure the channel/transport, e.g., by applying SSL encryption or any of the other security mechanisms listed above. Connection maintenance module 320 may represent a module configured to negotiate or otherwise monitor a Quality of Service (QoS) of UAL transport 302, a bandwidth of UAL transport 302, a latency of the UAL transport 302, a burstiness of UAL transport 302, and/or any other characteristic or, in other words, selection criteria of the UAL transport 302. Connection maintenance module 320 may also perform reconnects as a result of disruptions to UAL transport 302.

As further shown in the example of FIG. 3, LAL protocol modules 306 include a base projection module 330, a cluster projection module 332, an assistant integration module 334, a playback module 336, and a sensor module 338 (as well as other modules supported by LAL protocol modules 306 that are not shown in the example of FIG. 3 for ease of illustration purposes). Base projection module 330 represents a legacy projection module that requests a specific transport be configured prior to initiating projection via the requested transport.

UAL transport modules 304 may, as noted above, translate this request into a general request for a transport and then configure UAL transport 302 based on the forgoing selection criteria, which may configure the specifically requested transport or a different transport as UAL transport 302. After configuring UAL transport 302, UAL base protocol modules 304 may continue to translate requests for projecting data to accommodate UAL transport 302, possibly switching the underlying transport used for UAL transport 302 to project the data from application 104 to vehicle head unit 102.

Cluster projection module 332 may represent a module configured to manage clustered projection from one or more primary devices, e.g., including primary device 100. Cluster projection module 332 may enable multiple primary devices to project to one or more displays, e.g., display 116, of vehicle head unit 102. In some instances, multiple primary devices may project to the same display, e.g., display 116, or to two or more different displays (which vehicle head unit 102 may include although not shown in the example of FIG. 1).

Assistant integration module 334 may represent a module configured to facilitate integration of a voice and/or text assistant during projection of data to vehicle head unit 102. A voice/text assistant may provide various assistant services during projection of data to vehicle head unit 102, allowing an occupant of the vehicle to interact with the assistant to request, as a few examples, navigation, text message composition, text message playback (in which the assistant reads aloud an incoming text message), music playback (including streaming music playback), video playback (including streaming video playback), and the like.

Playback module 336 may represent a module configured to perform music and/or video playback via projection of data representative of music and/or video to vehicle head unit 102. Playback module 336 may interface, via the projection mode, with an audio and/or video (AV) system of vehicle head unit 102 to perform playback of music and/or video. While described with respect to music, playback module 336 may perform any form of audio playback, including playback of assistant audio (e.g., reading aloud an incoming text message), navigation (e.g., audio associated with directions), and the like.

Sensor module 338 may represent a module configured to interface with sensors of vehicle head unit 102. Sensor module 338 may issue requests for sensor data from sensors coupled to vehicle head unit 102, including sensors such as a GPS sensor, an ambient light sensor, a proximity sensor, an altimeter, a gyroscope, and any other sensor commonly found in vehicles.

Figure 4:
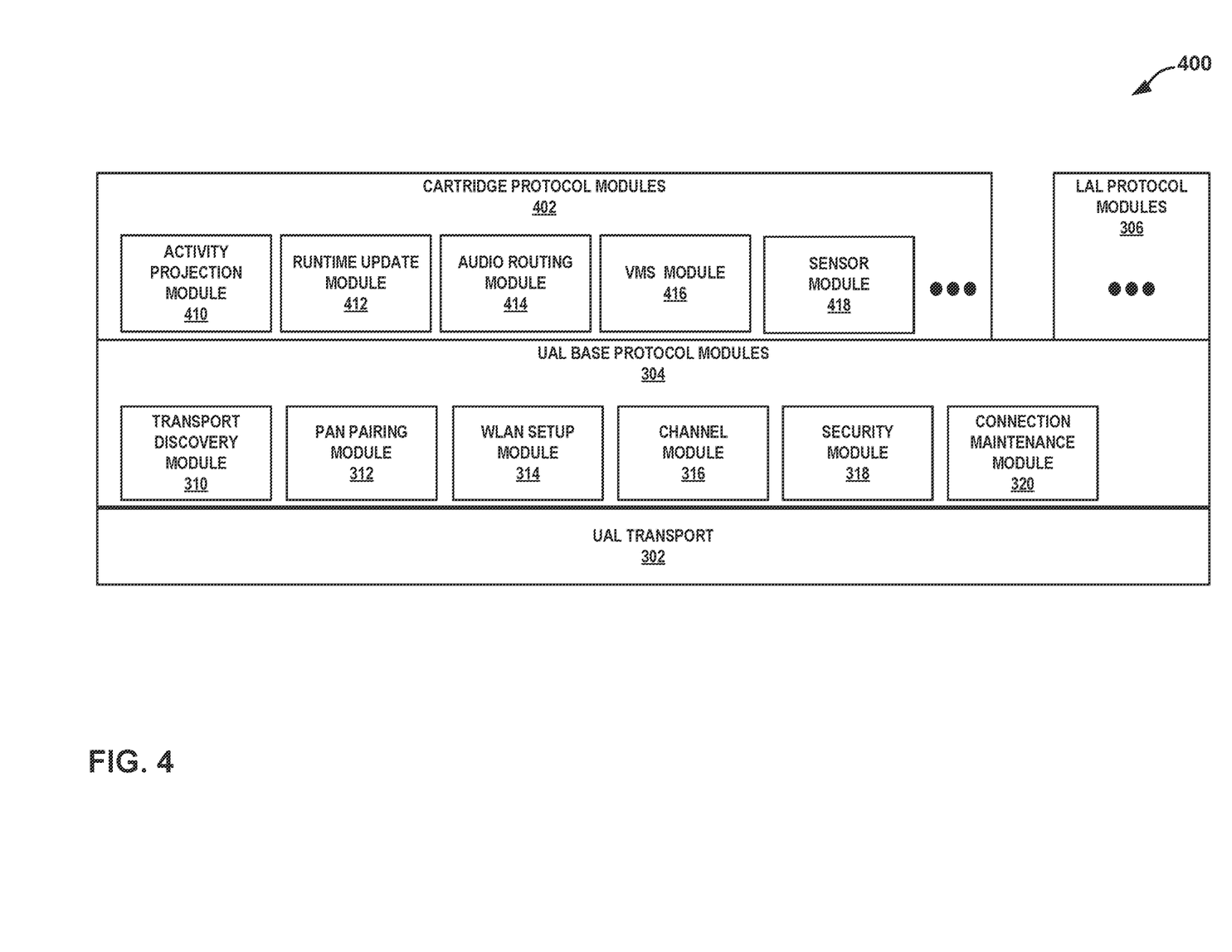
FIG. 4 is another block diagram illustrating a conceptual diagram of a hierarchical architecture of an operating system by which seamless switchable transport management may occur in accordance with various aspects of the techniques described in this disclosure.

FIG. 4 is another block diagram illustrating a conceptual diagram of a hierarchical architecture of an operating system by which seamless switchable transport management may occur in accordance with various aspects of the techniques described in this disclosure. Operating system 400 may represent an example of operating system 103 and/or operating system 113 that may configure one or more processors to, when executed, perform various aspects of the seamless transport management techniques described in this disclosure.

In the example of FIG. 4, operating system 400 is similar to operating system 300 in that operating system 400 includes UAL transport 302, UAL base transport protocol modules 304, and LAL protocol modules 306. However, operating system 400 includes another suite of protocol modules denoted cartridge protocol modules 402 that support connectivity between a cartridge, primary device 100 and vehicle head unit 102. More information regarding the cartridge can be found in U.S. patent application Ser. No. 17/065,932, entitled "EXTENSIBLE COMPUTING ARCHITECTURE FOR VEHICLES," filed Oct. 8, 2020.

Briefly, the cartridge may couple to vehicle head unit 102 as an extension to vehicle head unit 102, allowing the owner of the vehicle to upgrade vehicle head unit 102 via installation of the cartridge to present an updated in-vehicle experience. The owner of vehicle may install the cartridge, in other words, to upgrade physical hardware associated with vehicle head unit 102 and thereby provide an up-to-date user experience consistent with newer vehicle head units that does not require replacement of the entire vehicle head unit. Primary device 100 may couple to the cartridge (via a transport) and interact with the cartridge to project data from application 104, where the cartridge may act as an intermediate device to project the data from application 104 to vehicle head unit 102.

Cartridge protocol modules 402 may represent protocol modules configured to interface with the cartridge in order to perform the projection through the intermediate cartridge. Cartridge protocol modules 402 may include an activity projection module 410, a runtime update module 412, an audio routing module 414, a virtual machines (VMS) module 416, a sensor module 418, and additional modules similar to LAL protocol modules 306. Activity projection module 410 may represent a module configured to support pass-through projection of data received from application 104 executed by primary device 100.

Runtime update module 412 may represent a module configured to update shared resources (e.g., shared libraries) at runtime (or in other words at the time of execution) to allow for interconnectivity with primary device 100 and vehicle head unit 102. Audio routing module 414 represents a module configured to route audio data received via primary device 100 and vehicle head unit 102 between primary device 100 and vehicle head unit 102. VMS module 416 represents a module configured to execute virtual machines to provide various functionality associated with the cartridge described in the above referenced U.S. Patent Application. Sensor module 418 may represent a module similar to sensor module 318 except for the sensor module 418 may operate with respect to sensors present on the cartridge.

Figure 5:
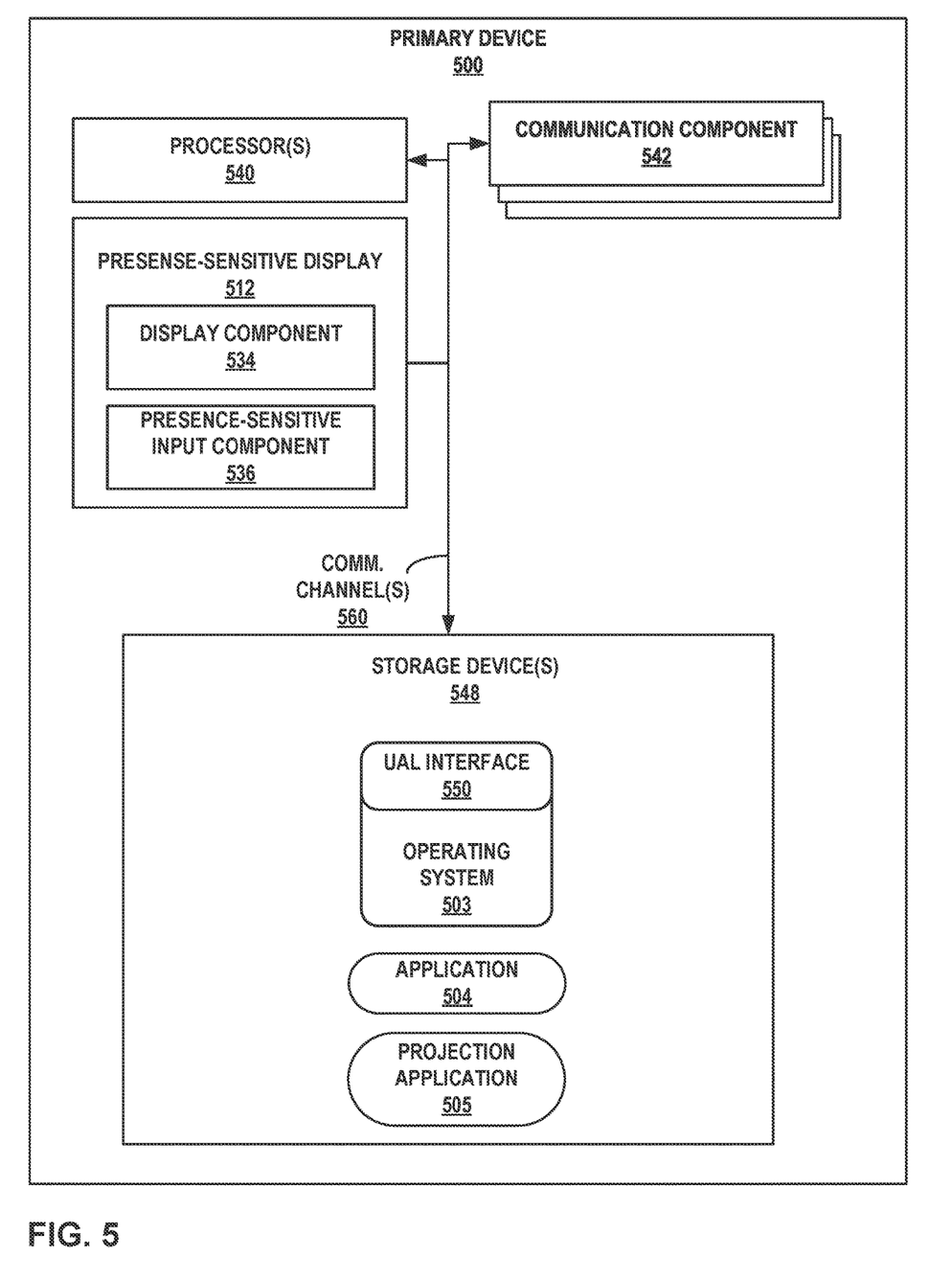
FIG. 5 is a block diagram illustrating, in greater detail, the primary device of FIG. 1.

FIG. 5 is a block diagram illustrating an example of the primary device of FIG. 1 in more detail. Primary device 500 shown in the example of FIG. 5 is one example of primary device 100 shown in FIG. 1. As shown in the example of FIG. 5, primary device 500 includes presence-sensitive display 512, one or more processors 540, one or more communication components 542, and one or more storage devices 548. Storage devices 548 of primary device 100 include an operating system 503 (which may be an example of operating system 103 shown in the example of FIG. 1) that presents a single UAL interface 550 by which to initiate, update, and otherwise maintain and/or manage a transport between primary device 500 and vehicle head unit 102.

Communication channels 560 may interconnect each of the components 512, 540, 542, and/or 148 for inter-component communications (physically, communicatively, and/or operatively) and thereby allow components 512, 540, 542, and 548 to communicate with one another. In some examples, communication channels 560 may include a system bus, a network connection, one or more inter-process communication data structures, or any other components for communicating data (also referred to as information). Although shown as including components 512, 540, 542, and 548, primary device 500 may include other components or less components than those shown, where such components may be included in other control units such as a telematic control unit (TCU).

One or more communication units 542 of primary device 500 may communicate with external devices by transmitting and/or receiving data. For example, primary device 500 may use one or more of communication units 542 to transmit and/or receive radio signals on a radio network such as a cellular radio network. In some examples, communication units 542 may transmit and/or receive satellite signals on a satellite network such as a Global Positioning System (GPS) network. Examples of communication units 542 include a network interface card (e.g. such as an Ethernet card), an optical transceiver, a radio frequency transceiver, a GPS receiver, or any other type of device that can send and/or receive information. Other examples of communication units 542 may include short wave radios (e.g., NFC, BLUETOOTH (including BLE)), GPS, 3G, 4G, 5G, and WIFI radios found in mobile devices as well as Universal Serial Bus (USB) controllers and the like.

In some examples, presence-sensitive display 512 of primary device 500 may include functionality of an input component and/or an output component. In the example of FIG. 5, presence-sensitive display 512 may include a presence-sensitive input (PSI) component 536 ("PSI component 536"), such as a presence-sensitive screen or touch-sensitive screen. In some examples, presence-sensitive input component 536 may detect an object at and/or near the presence-sensitive input component. As one example range, presence-sensitive input component 536 may detect an object, such as a finger or stylus that is within two inches or less of presence-sensitive input component 536. Presence-sensitive input component 536 may determine a location (e.g., an (x,y) coordinate) of the presence-sensitive input component at which the object was detected. In another example range, presence-sensitive input component 536 may detect an object two inches or less from presence-sensitive input component 536 and other ranges are also possible. Presence-sensitive input component 536 may determine the location of presence-sensitive input component 536 selected by a user's finger using capacitive, inductive, and/or optical recognition techniques.

In some examples, presence-sensitive display 512 may also provide output to a user using tactile, audio, or video stimuli. For instance, presence-sensitive display 512 may include display component 534 that displays a graphical user interface. Display component 534 may be any type of output component that provides visual output. While illustrated as an integrated component of primary device 500, presence-sensitive display 512 may, in some examples, be an external component that shares a data or information path with other components of primary device 500 for transmitting and/or receiving input and output. For instance, presence-sensitive display 512 may be a built-in component of primary device 500 located within and physically connected to the external packaging of primary device 500 (e.g., an in-vehicle screen mounted in a dashboard of a vehicle). In another example, presence-sensitive display 512 may be an external component of primary device 500 located outside and physically separated from the packaging of primary device 500 (e.g., a monitor, a projector, etc. that shares a wired and/or wireless data path with an electronic control unit of the vehicle). In some examples, presence-sensitive display 512, when located outside of and physically separated from the packaging of primary device 500, may be implemented by two separate components: a presence-sensitive input component 536 for receiving input and a display component 534 for providing output.

One or more storage devices 548 within primary device 500 may store information for processing during operation of primary device 500 (e.g., primary device 500 may store data accessed by operating system 503 during execution at primary device 500). In some examples, storage device 548 is a temporary memory, meaning that a primary purpose of storage device 548 is not long-term storage. Storage devices 548 on primary device 500 may be configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art.

Storage devices 548, in some examples, also include one or more computer-readable storage media. Storage devices 548 in some examples include one or more non-transitory computer-readable storage mediums. Storage devices 548 may be configured to store larger amounts of information than typically stored by volatile memory. Storage devices 548 may further be configured for long-term storage of information as non-volatile memory space and retain information after power on/off cycles. Examples of non-volatile memories include magnetic hard discs, optical discs, flash memories, or forms of electrically programmable memories (EPROM) or electrically erasable and programmable (EEPROM) memories. Storage devices 548 may store program instructions and/or information (e.g., data) associated with operating system 503, application 504 (which may be similar if not substantially similar to application 104), and projection application 505 (which may be similar if not substantially similar to projection application 105). Storage devices 548 may include a memory configured to store data or other information associated with operating system 503, application 504, and projection application 505.

One or more processors 540 may implement functionality and/or execute instructions associated with primary device 500. Examples of processors 540 include application processors, display controllers, auxiliary processors, one or more sensor hubs, and any other hardware configure to function as a processor, a processing unit, or a processing device. Operating system 503, application 504, and projection application 505 may be operable (or, in other words, executed) by processors 540 to perform various actions, operations, or functions of primary device 500. That is, modules 503-505 may form executable bytecode, which when executed, cause processors 540 to perform specific operations in accordance with (and thereby causing primary device 500 to become a specific-purpose computer by which to perform) various aspects of the techniques described herein. For example, processors 540 of primary device 500 may retrieve and execute instructions stored by storage devices 548 that cause processors 540 to perform the operations described herein that are attributed to operating system 503, application 504, and projection application 505. The instructions, when executed by processors 540, may cause primary device 500 to store information within storage devices 548.

As further shown in the example of FIG. 5, operating system 503 includes a UAL interface 550, which is another way of referring to the portion of the operating system denoted as operating system 300 (in the example of FIG. 3) and operating system 400 (in the example of FIG. 4). As such, UAL interface 550 may present a single communication interface by which to request a transport, which operating system 503 may select based on one or more of the selection criteria noted above.

Operating system 503 may monitor the underlying UAL transport provided by way of UAL interface 550 and identify when the UAL transport is insufficient to accommodate projection of the data by application 504 sourcing the data via projection application 505. Responsive to determining that the UAL transport is insufficient to accommodate projection of the data by application 504, UAL interface 550 may select a different transport as the UAL transport. UAL interface 550 may switch from the current transport to the different transport, establishing a new UAL transport seamlessly (meaning, without being detected by or informing application 504 and/or projection application 505 and during execution of the projection mode to project the data sourced by application 504). Operating system 503 may then continue to project the data sourced by application 504 to vehicle head unit 102 via the UAL transport.

Figure 6:
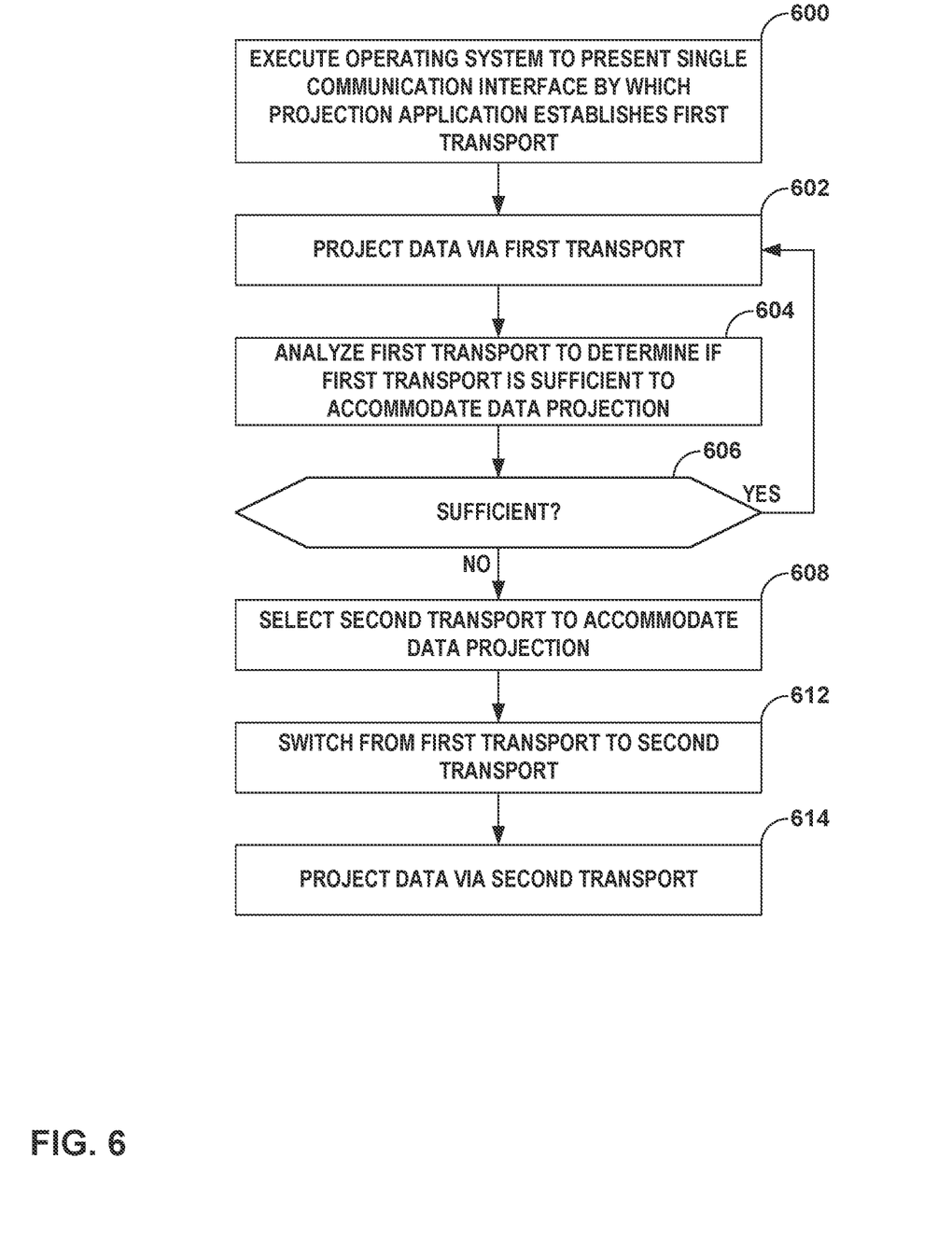
FIG. 6 is a flowchart illustrating exemplary operation of the primary device of FIG. 1 in seamlessly switching between transports during execution of a projection mode in accordance with techniques of this disclosure.

FIG. 6 is a flowchart illustrating exemplary operation of the primary device of FIG. 1 in seamlessly switching between transports during execution of a projection mode in accordance with techniques of this disclosure. In the example of FIG. 6, primary device 100 may execute operating system 103 to present a single communication interface (e.g., UAL interface 550 shown in the example of FIG. 5) by which projection application 105 may establish transport 109 (600) between primary device 100 and vehicle head unit 102 that facilitates execution of a projection mode (e.g., one or more of projection of music audio data via a PAN transport 109, projection of a GUI data via a wireless or wired transport 109, etc.). for presentation by vehicle head unit 102.

Projection application 105, responsive to receiving transport 109, may project the data (e.g., sourced by application 104) via transport 109 (602). Operating system 103 may analyze transport 109 (e.g., periodically, responsive to some threshold change in data characteristics, via user prompt, etc.) to determine if transport 109 is sufficient to accommodate data projection (604). That is, operating system 103 may monitor various selection criteria noted above, such as data burstiness, latency of transport 109, bandwidth of transport 109, interference (as represented by dropped packets for example) of transport 109, or other characteristics, comparing these selection criteria to various threshold that identify when transports are insufficient to accommodate the projection data.

When transport 109 is determined to be sufficient ("YES" 606), operating system 103 may continue to allow projection application 105 to project data via transport 109, continuing to analyze transport 109 (602, 604). When transport 109 is determine to be insufficient ("NO", operating system 103 may select a second transport 119 to accommodate data projection (608). For example, when operating system 109 determines that there is insufficient bandwidth to support projection data (e.g., because the user switched from streaming music to both streaming music and performing navigation), operating system 109 may select a wired transport as transport 119. In any event, operating system 103 may seamlessly switch from transport 109 to transport 119 (610), enabling projection application 105 to continue to project data via transport 119 (612).

In this way, various aspects of the techniques may enable the following clauses.

Clause 1. A method comprising: presenting, by an operating system executed by a primary device, a single communication interface by which an application establishes a first transport between the primary device and a vehicle head unit that facilitates execution of a mode in which the application provides data for presentation by the vehicle head unit; transmitting, by the application and during execution of the mode, the data via the first transport; switching, by the operating system and during execution of the mode, from the first transport to a second transport; and transmitting, by the application and during execution of the mode, the data via the second transport.

Clause 2. The method of clause 1, further comprising negotiating, via the single communication interface, platform requirements with respect to the vehicle head unit and the primary device to facilitate establishing a socket stream to be used by the second transport during execution of the mode.

Clause 3. The method of any combination of clauses 1 and 2, further comprising selecting, by the operating system, the second transport based on one or more characteristics of a plurality of characteristics of the data transmitted by the application.

Clause 4. The method of clause 3, wherein the application comprises a first application, and wherein the plurality of characteristics comprises a type of a second application sourcing the data, an amount of bandwidth requested by the second application sourcing the data, and a capability of the second application sourcing the data to provide a service.

Clause 5. The method of clause 4, wherein the service is at least one of audio streaming, video streaming, voice assistance, cellular communication, and information display.

Clause 6. The method of any combination of clauses 1-5, further comprising selecting, by the operating system, the second transport based on at least one of a type of data to be communicated via the second transport, an amount of data to be communicated via the second transport, or a packet of data to be communicated via the second transport.

Clause 7. The method of any combination of clauses 1-6, further comprising selecting, by the operating system, the second transport based on at least one of a latency threshold or a burstiness tolerance of an application sourcing the data.

Clause 8. The method of any combination of clauses 1-7, wherein the first transport and the second transport each comprises one of a personal area network transport, a wireless local area network transport, and a wired transport.

Clause 9. The method of any combination of clauses 1-8, wherein the first transport and the second transport each comprises different versions of a same personal area network transport.

Clause 10. The method of clause 9, wherein the different versions of the same personal area network transport comprise a low energy version of the same personal area network transport and a high energy version of the same personal area network transport.

Clause 11. The method of any combination of clauses 1-10, wherein the application comprises a projection application, and wherein the mode comprises a projection mode in which the projection application projects the data for presentation by the vehicle head unit.

Clause 12. A primary device comprising: a memory configured to store an operating system and an application; and one or more processors configured to: execute the operating system to present a single communication interface by which the application establishes a first transport between the primary device and a vehicle head unit that facilitates execution of a mode in which the application provides data for presentation by the vehicle head unit; and execute the application to transmit, during execution of the mode, the data via the first transport; wherein the operating system switches, during execution of the mode, from the first transport to a second transport, and wherein the application transmits, during execution of the mode, the data via the second transport.

Clause 13. The primary device of clause 12, wherein the one or more processors are further configured to negotiate, via the single communication interface, platform requirements with respect to the vehicle head unit and the primary device to facilitate establishing a socket stream to be used by the second transport during execution of the mode.

Clause 14. The primary device of any combination of clauses 12 and 13, wherein the one or more processors are further configured to execute the operating system to negotiate select the second transport based on one or more characteristics of a plurality of characteristics of the data transmitted by the application.

Clause 15. The primary device of clause 14, wherein the application comprises a first application, and wherein the plurality of characteristics comprises a type of a second application sourcing the data, an amount of bandwidth requested by the second application sourcing the data, and a capability of the second application sourcing the data to provide a service.

Clause 16. The primary device of any combination of clauses 12-15, wherein the one or more processors are further configured to execute the operating system to select the second transport based on at least one of a type of data to be communicated via the second transport, an amount of data to be communicated via the second transport, or a packet of data to be communicated via the second transport.

Clause 17. The primary device of any combination of clauses 12-16, wherein the one or more processors are further configured to execute the operating system to select the second transport based on at least one of a latency threshold or a burstiness tolerance of an application sourcing the data.

Clause 18. The primary device of any combination of clauses 12-17, wherein the first transport and the second transport each comprises one of a personal area network transport, a wireless local area network transport, and a wired transport.

Clause 19. The primary device of any combination of clauses 12-18, wherein the application comprises a projection application, and wherein the mode comprises a projection mode in which the projection application projects the data for presentation by the vehicle head unit.

Clause 20. A non-transitory computer-readable storage medium having instructions stored thereon that, when executed, cause one or more processors of a primary device to: execute an operating system to present a single communication interface by which a application establishes a first transport between the primary device and a vehicle head unit that facilitates execution of a mode in which the application provides data for presentation by the vehicle head unit; and execute the application to transmit, during execution of the mode, the data via the first transport; wherein the operating system switches, during execution of the mode, from the first transport to a second transport, and wherein the application transmits, during execution of the mode, the data via the second transport.

By way of example, and not limitation, such computer-readable storage media can comprise RAM, ROM, EEPROM, CD-ROM or other optical disk storage, magnetic disk storage, or other magnetic storage devices, flash memory, or any other storage medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage mediums and media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable medium.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

What is claimed is:

1. A method comprising:
presenting, by an operating system executed by a primary device, a single communication interface by which a projection application establishes a first transport between the primary device and a vehicle head unit that facilitates execution of a projection mode in which the projection application projects data for presentation by the vehicle head unit, the data including at least a graphical user interface for presentation by the vehicle head unit;
transmitting, by the projection application and during execution of the projection mode to project the graphical user interface, the data via the first transport;
switching, by the operating system and during execution of the projection mode to project the graphical user interface from the primary device to the vehicle head unit, from the first transport to a second transport; and
transmitting, by the projection application and during execution of the projection mode to project the graphical user interface, the data via the second transport.

2. The method of claim 1, further comprising negotiating, via the single communication interface, platform requirements with respect to the vehicle head unit and the primary device to facilitate establishing a socket stream to be used by the second transport during execution of the projection mode.

3. The method of claim 1, further comprising selecting, by the operating system, the second transport based on one or more characteristics of a plurality of characteristics of the graphical user interface transmitted by the projection application.

4. The method of claim 3,
wherein the projection application comprises a first application, and
wherein the plurality of characteristics comprises a type of a second application sourcing the data, an amount of bandwidth requested by the second application sourcing the data, and a capability of the second application sourcing the data to provide a service.

5. The method of claim 4, wherein the service is at least one of audio streaming, video streaming, voice assistance, cellular communication, and information display.

6. The method of claim 1, further comprising selecting, by the operating system, the second transport based on at least one of a type of at least a portion of the data to be communicated via the second transport, an amount of at least the portion of the data to be communicated via the second transport, or a packet of at least the portion of the data to be communicated via the second transport.

7. The method of claim 1, further comprising selecting, by the operating system, the second transport based on at least one of a latency threshold or a burstiness tolerance of an application sourcing at least a portion of the data.

8. The method of claim 1, wherein the first transport and the second transport each comprises one of a personal area network transport, a wireless local area network transport, and a wired transport.

9. The method of claim 1, wherein the first transport and the second transport each comprises different versions of a personal area network transport.

10. The method of claim 9, wherein the different versions of the same personal area network transport comprise a low energy version of the personal area network transport and a high energy version of the personal area network transport.

11. A primary device comprising:
a memory configured to store an operating system and a projection application; and
one or more processors configured to:
execute the operating system to present a single communication interface by which the projection application establishes a first transport between the primary device and a vehicle head unit that facilitates execution of a projection mode in which the projection application projects data for presentation by the vehicle head unit, the data including at least a graphical user interface for presentation by the vehicle head unit; and execute the projection application to transmit, during execution of the projection mode to project the graphical user interface, the data via the first transport, wherein the operating system switches, during execution of the projection mode to project the graphical user interface from the primary device to the vehicle head unit, from the first transport to a second transport, and wherein the projection application transmits, during execution of the projection mode to present the graphical user interface, the data via the second transport.

12. The primary device of claim 11, wherein the one or more processors are further configured to negotiate, via the single communication interface, platform requirements with respect to the vehicle head unit and the primary device to facilitate establishing a socket stream to be used by the second transport during execution of the mode.

13. The primary device of claim 11, wherein the one or more processors are further configured to execute the operating system to select the second transport based on one or more characteristics of a plurality of characteristics of the data transmitted by the projection application.

14. The primary device of claim 13,
wherein the projection application comprises a first application, and
wherein the plurality of characteristics comprises a type of a second application sourcing at least a portion of the data, an amount of bandwidth requested by the second application sourcing at least the portion of the data, and a capability of the second application sourcing at least the portion of the data to provide a service.

15. The primary device of claim 11, wherein the one or more processors are further configured to execute the operating system to select the second transport based on at least one of a type of at least a portion of the data to be communicated via the second transport, an amount of at least the portion of the data to be communicated via the second transport, or a packet of at least the portion of the data to be communicated via the second transport.

16. The primary device of claim 11, wherein the one or more processors are further configured to execute the operating system to select the second transport based on at least one of a latency threshold or a burstiness tolerance of an application sourcing the data.

17. The primary device of claim 11, wherein the first transport and the second transport each comprises one of a personal area network transport, a wireless local area network transport, and a wired transport.

18. A non-transitory computer-readable storage medium having instructions stored thereon that, when executed, cause one or more processors of a primary device to:

execute an operating system to present a single communication interface by which a projection application establishes a first transport between the primary device and a vehicle head unit that facilitates execution of a projection mode in which the projection application provides data for presentation by the vehicle head unit, the data including at least a graphical user interface for presentation by the vehicle head unit; and execute the projection application to transmit, during execution of the projection mode to project the graphical user interface, the data via the first transport;

wherein the operating system switches, during execution of the projection mode to project the graphical user interface from the primary device to the vehicle head unit, from the first transport to a second transport, and wherein the projection application transmits, during execution of the projection mode to project the graphical user interface, the data via the second transport.

* * * * *